(12) United States Patent
Sohn

(10) Patent No.: US 10,721,408 B1
(45) Date of Patent: Jul. 21, 2020

(54) AUTOMATIC EXPOSURE IMAGING SYSTEM AND METHOD

(71) Applicant: Himax Imaging Limited, Tainan (TW)

(72) Inventor: Youngchul Sohn, Tainan (TW)

(73) Assignee: Himax Imaging Limited, Tainan (TW)

( * ) Notice: Subject to any disclaimer, the term of this patent is extended or adjusted under 35 U.S.C. 154(b) by 5 days.

(21) Appl. No.: 16/232,943

(22) Filed: Dec. 26, 2018

(51) Int. Cl.
*H04N 5/235* (2006.01)
*H04N 5/232* (2006.01)
*H04N 5/341* (2011.01)
*H04N 5/3745* (2011.01)

(52) U.S. Cl.
CPC ....... *H04N 5/2353* (2013.01); *H04N 5/23229* (2013.01); *H04N 5/23267* (2013.01); *H04N 5/341* (2013.01); *H04N 5/3745* (2013.01)

(58) Field of Classification Search
CPC .... H04N 5/235; H04N 5/2351; H04N 5/2353; H04N 5/2354
USPC .................. 348/152, 154, 155, 208.1, 221.1
See application file for complete search history.

(56) References Cited

U.S. PATENT DOCUMENTS

| 2001/0013903 | A1* | 8/2001 | Suzuki | H04N 5/2353 348/362 |
| 2003/0095189 | A1* | 5/2003 | Liu | H04N 5/23248 348/208.4 |
| 2007/0237514 | A1* | 10/2007 | Pillman | H04N 5/23254 396/153 |

\* cited by examiner

*Primary Examiner* — Anthony J Daniels
(74) *Attorney, Agent, or Firm* — Stout, Uxa & Buyan, LLP; Donald E. Stout

(57) ABSTRACT

An automatic exposure (AE) imaging system includes an image sensor that captures an analog image; an analog-to-digital converter (ADC) that converts the analog image into a digital image; a single-frame image processor that processes the digital image; an exposure quantizer that generates a discrete number representing a determined exposure time according to an output of the single-frame image processor; a multi-exposure controller, under control of a motion-detect signal, generating a plurality of different exposure times in sequence in each frame period in a motion detection mode, and outputting the determined exposure time in a streaming mode; and a pixel controller coupled to receive an output of the multi-exposure controller, according to which the image sensor is controlled.

10 Claims, 6 Drawing Sheets

AUTOMATIC EXPOSURE IMAGING SYSTEM AND METHOD

BACKGROUND OF THE INVENTION

1. Field of the Invention

The present invention generally relates to an imaging system, and more particularly to an automatic exposure (AE) imaging system with motion detection.

2. Description of Related Art

Cameras have been widely used for image/video based analysis to extract information. A lot of bandwidth and power, however, are required to transmit and process the captured image or video. In order to reduce the bandwidth and power, event-triggered cameras have been proposed to screen out redundant image or video such that only images or video containing information being of use are actually transmitted and processed. The information being of use may be identified, for example, whenever motion occurs.

In a worst scenario when brightness changes abruptly from dark to bright shortly before motion event is detected, conventional imaging system cannot successfully detect the motion for the reason that exposure time needs be gradually adjusted such that an appropriate exposure time can only be determined after the duration spanning several frame periods has elapsed. Therefore, the conventional imaging system cannot detect the motion in time, or even fails to detect the motion.

A need has thus arisen to propose a novel scheme capable of successfully and timely detecting motion even in a worst scenario when brightness changes abruptly from dark to bright shortly before motion occurs.

SUMMARY OF THE INVENTION

In view of the foregoing, it is an object of the embodiment of the present invention to provide an automatic exposure (AE) imaging system and method with motion detection capable of timely and successfully detecting motion event.

According to one embodiment, an automatic exposure (AE) imaging system includes an image sensor, an analog-to-digital converter (ADC), a single-frame image processor, an exposure quantizer, a multi-exposure controller and a pixel controller. The image sensor captures an analog image, and the ADC converts the analog image into a digital image. The single-frame image processor processes the digital image. The exposure quantizer generates a discrete number representing a determined exposure time according to an output of the single-frame image processor. The multi-exposure controller, under control of a motion-detect signal, generates a plurality of different exposure times in sequence in each frame period in a motion detection mode, and outputs the determined exposure time in a streaming mode. The pixel controller is coupled to receive an output of the multi-exposure controller, according to which the image sensor is controlled.

DETAILED DESCRIPTION OF THE INVENTION

Figure 1:
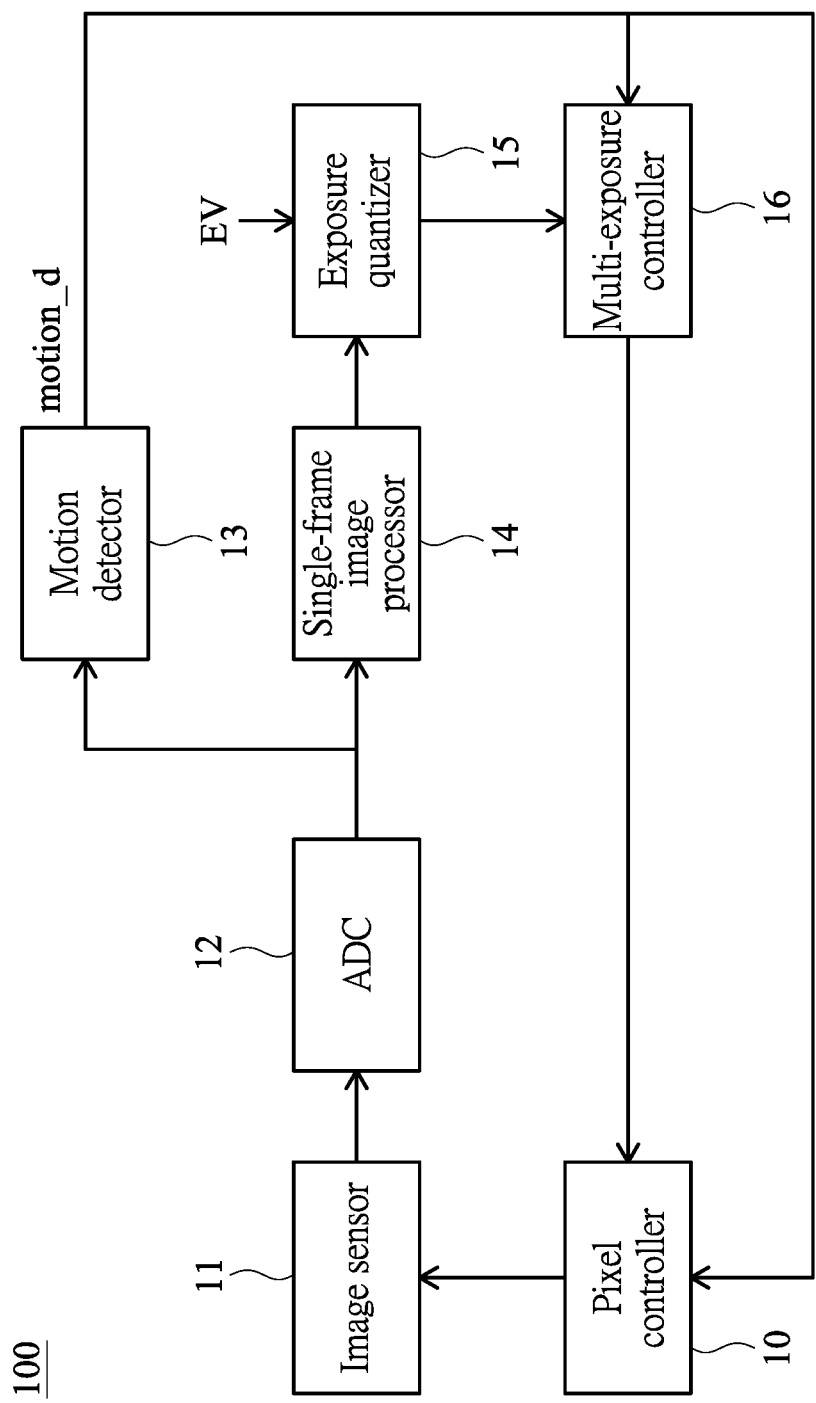
FIG. 1 shows a block diagram illustrating an automatic exposure (AE) imaging system with motion detection according to one embodiment of the present invention.
Figure 2:
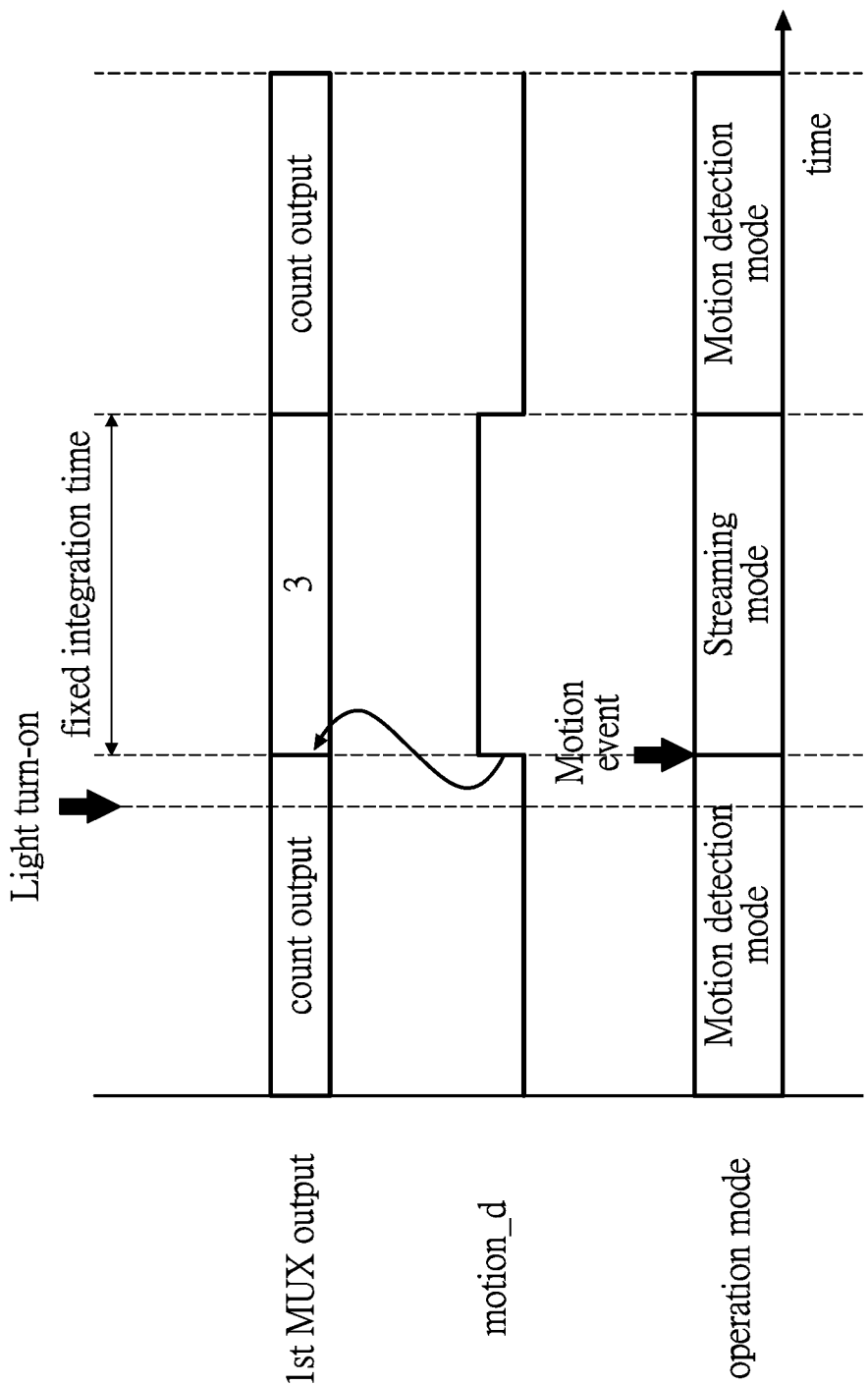
FIG. 2 shows exemplary timing diagrams of pertinent signals of FIG. 1.

FIG. 1 shows a block diagram illustrating an automatic exposure (AE) imaging system 100 with motion detection according to one embodiment of the present invention. FIG. 2 shows exemplary timing diagrams of pertinent signals of FIG. 1. It is appreciated that the blocks of the AE imaging system (system hereinafter) 100 may be implemented by hardware (e.g., image signal processor), software or their combination.

In the embodiment, the system 100 may include an image sensor 11, such as an active-pixel sensor (APS), configured to capture an analog image. The system 100 of the embodiment may include an analog-to-digital converter (ADC) 12 coupled to receive the analog image and configured to convert the analog image into a digital image.

The system 100 may include a motion detector 13 coupled to receive the digital image, and configured to generate a motion-detect signal motion_d, which is asserted (e.g., logical high level) when motion event is detected, according to a preceding digital image and a current digital image. As exemplified in FIG. 2, the system 100 is in a motion detection mode when the motion-detect signal motion_d is de-asserted (indicating that no motion event is detected), otherwise the system 100 is in a streaming mode when the motion-detect signal motion_d is asserted (indicating that motion event is detected).

According to one aspect of the embodiment, the system 100 may include a single-frame image processor 14 coupled to receive the digital image from the ADC 12, and configured to process one (or single) frame of the digital image in a frame period. To the contrary, the conventional imaging system uses a multi-frame image processor configured to process multiple frames of the digital image in multiple frame periods in order to decide a proper exposure time.

According to another aspect of the embodiment, the system 100 may include an exposure quantizer 15 configured to generate a discrete number (representing a determined exposure time or integration time) from a finite set of plural (e.g., four) discrete numbers (e.g., non-negative integers) (respectively representing different exposure times) according to an output of the single-frame image processor 14 and a predetermined value EV. For example, the exposure quantizer 15 may generate a discrete number from a finite set composed of discrete numbers 0, 1, 2 and 3. In the specification, the terms "exposure time" and "integration time" may be used interchangeably.

Figure 3:
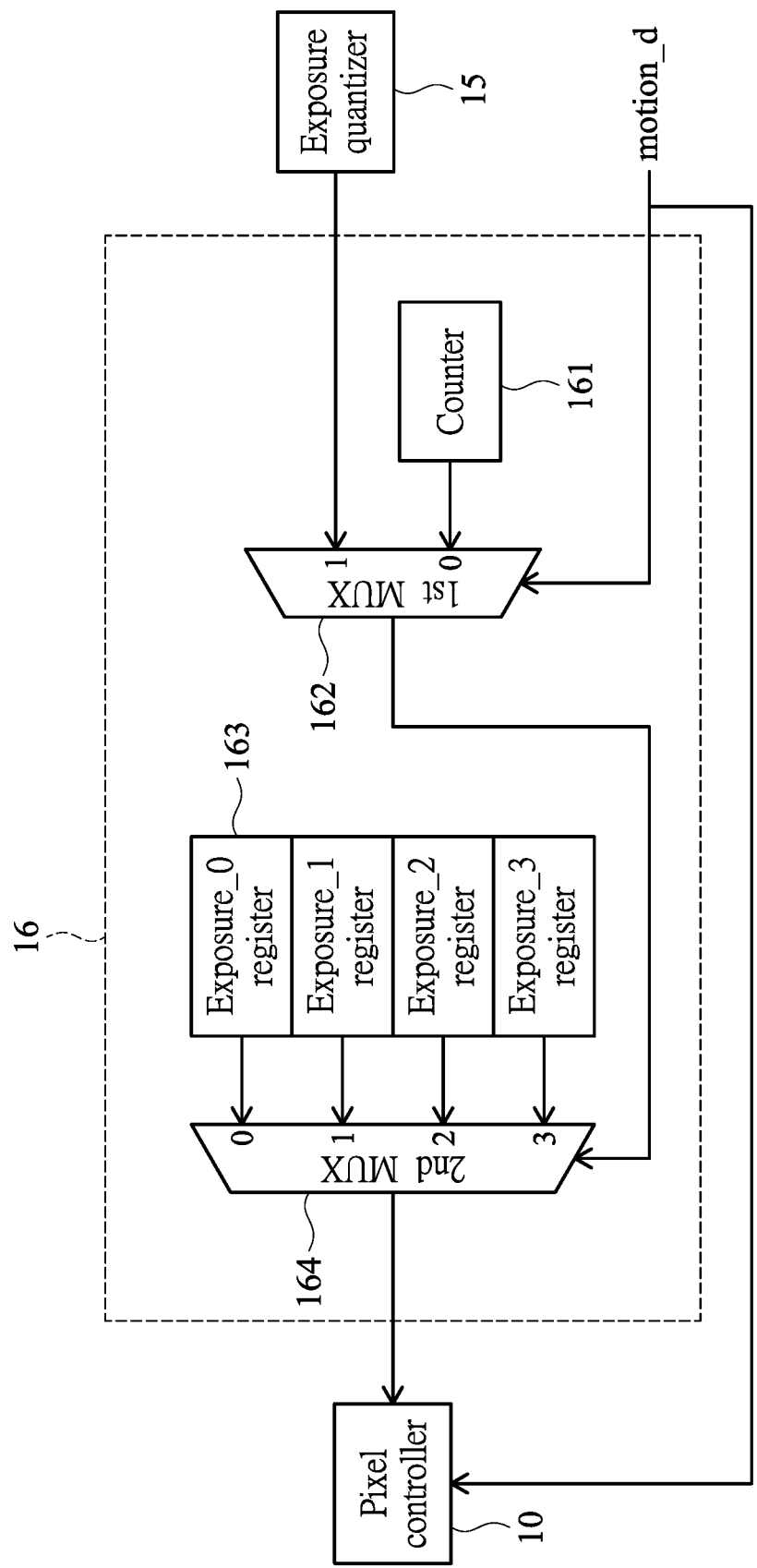
FIG. 3 shows a detailed block diagram illustrating the multi-exposure controller of FIG. 1.

According to a further aspect of the embodiment, the system 100 may include a multi-exposure controller 16 coupled to receive the determined exposure time from the exposure quantizer 15 under control of the motion-detect signal motion_d. FIG. 3 shows a detailed block diagram illustrating the multi-exposure controller 16 of FIG. 1.

Specifically, the multi-exposure controller 16 may include a counter 161 configured to generate a count output by counting a sequence of n non-negative integers (e.g., 0, 1, 2, . . . , n−1), where n is a predetermined positive integer. The multi-exposure controller 16 may include a first multiplexer (MUX) 162 (e.g., a 2-to-1 multiplexer) coupled to receive the generated discrete number (representing the determined exposure time from the exposure quantizer 15) and the count output (from the counter 161), one of which is controllably routed to an output of the first multiplexer 162. Specifically, the first multiplexer 162 may be controlled by the motion-detect signal motion_d. As exemplified in FIG. 2, when the motion-detect signal motion_d is asserted (e.g., logical high level) representing a motion event, the generated discrete number (representing the determined exposure time from the exposure quantizer 15) at the first input (1) is routed to the output, otherwise the count output (from the counter 161) at the second input (0) is routed to the output.

The multi-exposure controller 16 may include a plurality of registers 163 configured to store different exposure times, respectively. For example, the plurality of registers 163 may include an exposure_0 register, an exposure_1 register, an exposure_2 register and an exposure_3 register. The multi-exposure controller 16 may include a second multiplexer (MUX) 164 (e.g., a 4-to-1 multiplexer) coupled to receive the exposure times (stored in the registers 163), one of which is controllably routed to an output of the second multiplexer 164. Specifically, the second multiplexer 164 may be controlled by the output of the first multiplexer 162.

According to the architecture shown in FIG. 3, in the motion detection mode (indicating that no motion event is detected), the multi-exposure controller 16 generates a plurality (e.g., four) of different exposure times in sequence in each frame period, instead of only one exposure time in a frame period as in the conventional imaging system. In the streaming mode (indicating that motion event is detected), the multi-exposure controller 16 outputs the determined exposure time (generated by the exposure quantizer 15).

Figure 4A:
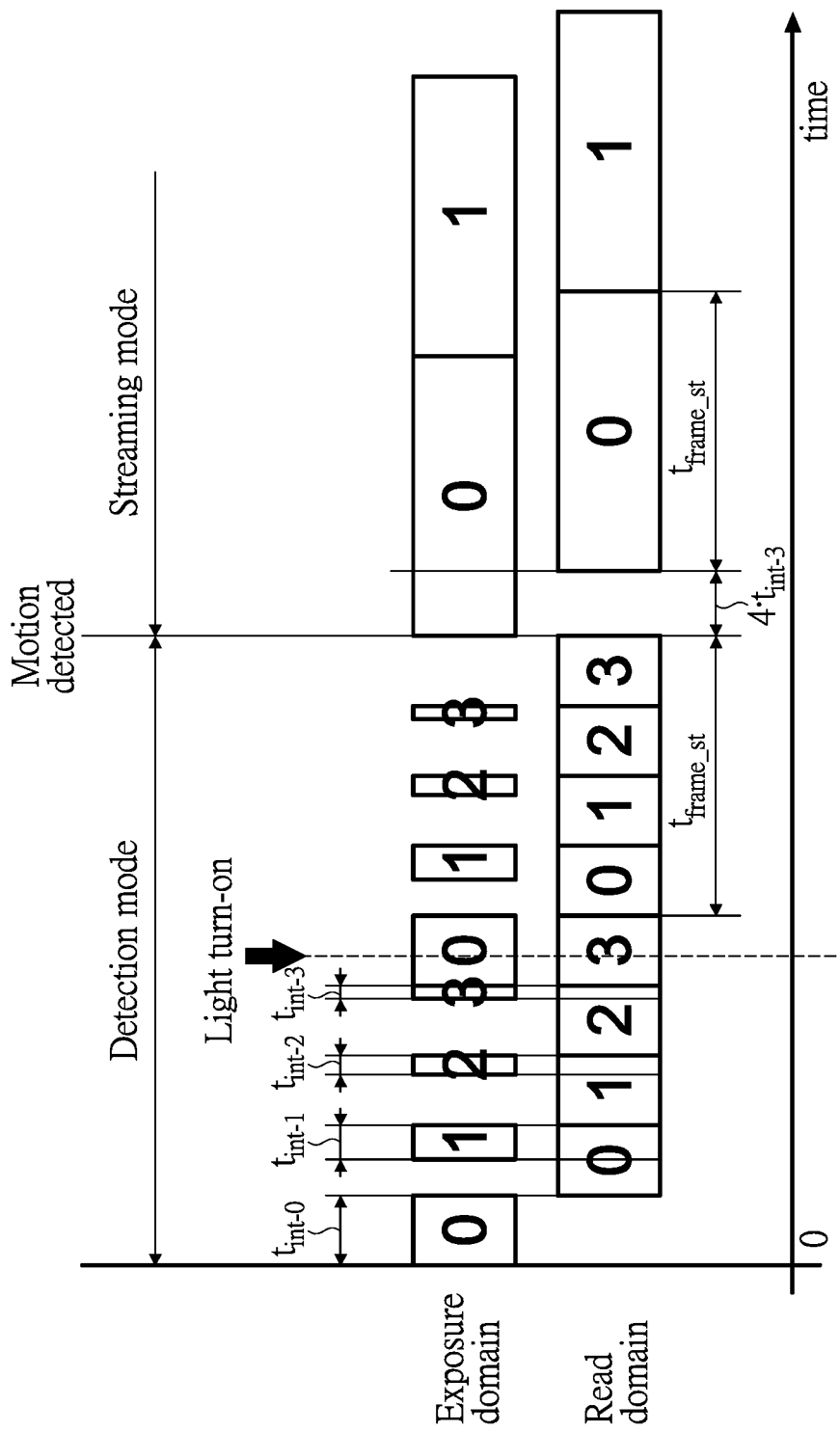
FIG. 4A shows exemplary timing diagrams in exposure domain and read domain respectively of the multi-exposure controller of FIG. 1.

FIG. 4A shows exemplary timing diagrams in exposure domain and read (or scan) domain respectively of the multi-exposure controller 16 of FIG. 1. In one example, the exposure_0 register, the exposure_1 register, the exposure_2 register and the exposure_3 register of the registers 163 respectively store, for example, from large to small, integration times $t_{int-0}$, $t_{int-1}$, $t_{int-2}$ and $t_{int-3}$. In this example, $t_{int-3}=(½)t_{int-2}=(¼)t_{int-1}=(⅛)t_{int-0}=(1/32)t_{frame\_st}$, where $t_{frame\_st}$ represents a frame period. In the motion detection mode, the integration times $t_{int-0}$, $t_{int-1}$, $t_{int-2}$ and $t_{int-3}$ are adopted in sequence in each frame period until a motion event is detected (i.e., when the motion-detect signal motion_d is asserted). It is appreciated that the sequence of adopting the integration times is not limited to the shown example. Referring to FIG. 2, after the motion event is detected (i.e., in streaming mode), the integration time (or exposure time) determined by the exposure quantizer 15 is adopted.

Figure 4B:
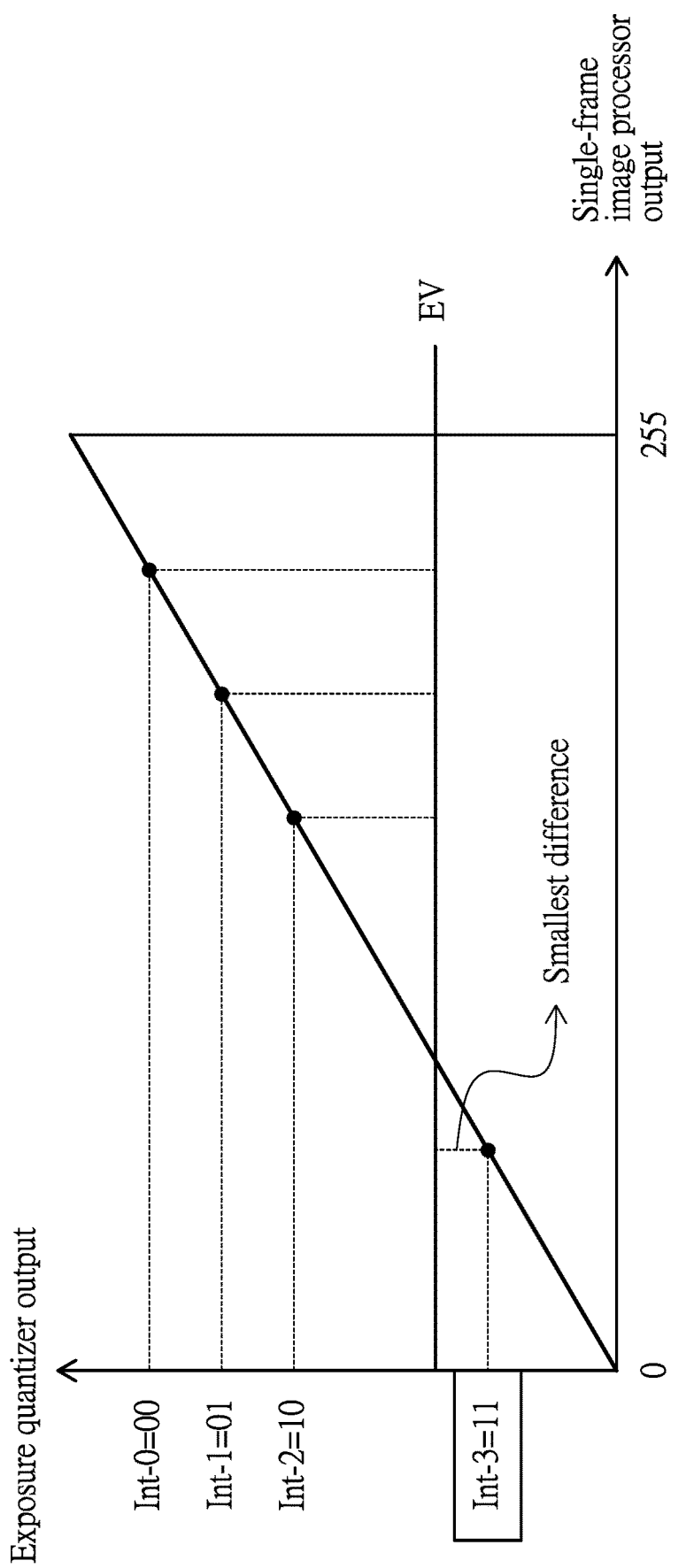
FIG. 4B shows exemplary relationship between different exposure times and the output of the single-frame image processor.

FIG. 4B shows exemplary relationship between different exposure times (e.g., int-0, int-1, int-2 and int-3) and the output of the single-frame image processor 14. The exposure quantizer 15 generates the discrete number representing an exposure time that is closest to the predetermined value EV (i.e., having smallest difference therebetween) as the determined exposure time.

Referring back to FIG. 1, the system 100 of the embodiment may include a pixel controller 10 coupled to receive the motion-detect signal motion_d and the output of the multi-exposure controller 16, according to which the image sensor 11 may be controlled. Specifically, in the streaming mode, the image sensor 11, such as an active-pixel sensor (APS), may perform sensing and reading by using entire image sensor; and in the motion detection mode, the image sensor 11 may perform sub-sampling or pixel binning mode in order to reduce pixel reading time. Moreover, the gain (or ISO) of the image sensor 11 may be adjusted according to the number of exposure values or times. For example, the predetermined gain may be amplified by four times when the number of predetermined exposure values is four, thereby decreasing exposure time.

Figure 5A:
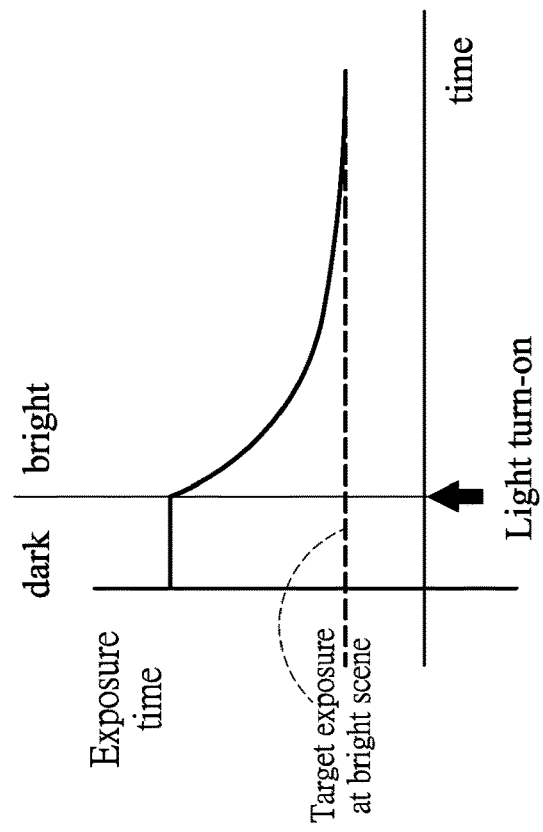
FIG. 5A shows a curve demonstrating exposure time vs time without adopting aspects of the embodiment.
Figure 5B:
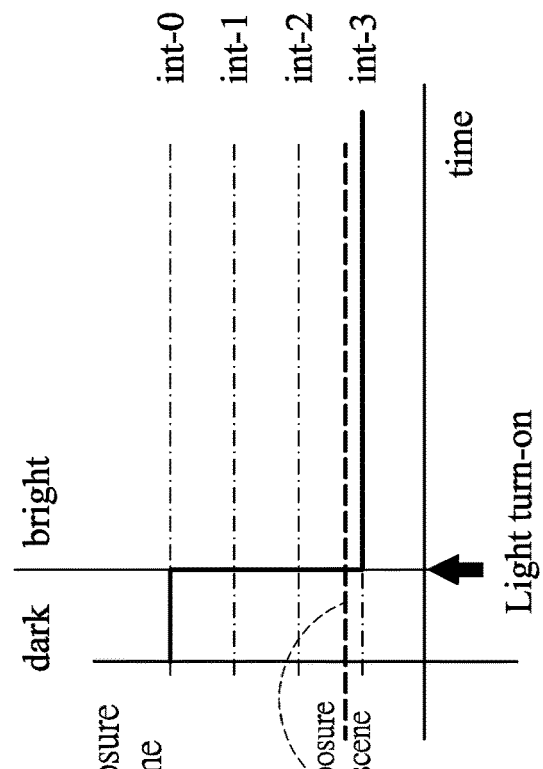
FIG. 5B shows a curve demonstrating exposure time vs time according aspects of the embodiment.

FIG. 5A shows a curve demonstrating exposure time vs time without adopting aspects of the embodiment. FIG. 5B shows a curve demonstrating exposure time vs time according aspects of the embodiment, particularly the exposure quantizer 15 and the multi-exposure controller 16. It is observed that operation in FIG. 5B is substantially faster than that in FIG. 5A.

In a worst scenario, in which brightness changes abruptly from dark to bright shortly before motion event is detected, the embodiment as set forth above can timely and successfully detect motion event due to fast exposure time determination (as shown in FIG. 5B), but the conventional imaging system cannot timely and successfully detect motion event owing to slow exposure time determination (as shown in FIG. 5A).

Although specific embodiments have been illustrated and described, it will be appreciated by those skilled in the art that various modifications may be made without departing from the scope of the present invention, which is intended to be limited solely by the appended claims.

What is claimed is:

1. An automatic exposure (AE) imaging system, comprising:
   an image sensor that captures an analog image;
   an analog-to-digital converter (ADC) that converts the analog image into a digital image;
   a single-frame image processor that processes the digital image;
   an exposure quantizer that generates a discrete number representing a determined exposure time according to an output of the single-frame image processor;
   a multi-exposure controller, under control of a motion-detect signal, generating a plurality of different exposure times in sequence in each frame period in a motion detection mode, and outputting the determined exposure time in a streaming mode; and
   a pixel controller coupled to receive an output of the multi-exposure controller, according to which the image sensor is controlled;
   wherein the multi-exposure controller comprises:
   a counter that generates a count output;
   a first multiplexer coupled to receive the generated discrete number and the count output, one of which is controllably routed to an output of the first multiplexer;
   a plurality of registers that store said different exposure times respectively; and
   a second multiplexer coupled to receive said different exposure times, one of which is controllably routed to an output of the second multiplexer under control of the output of the first multiplexer.

2. The AE imaging system of claim 1, further comprising:
   a motion detector coupled to receive the digital image and configured to generate the motion-detect signal according to a preceding digital image and a current digital image;

wherein the AE imaging system is in the streaming mode when the motion-detect signal is asserted, otherwise the AE imaging system is in the motion detection mode.

3. The AE imaging system of claim 1, wherein the exposure quantizer generates the discrete number further according to a predetermined value.

4. The AE imaging system of claim 3, wherein the exposure quantizer generates the discrete number representing an exposure time that is closest to the predetermined value as the determined exposure time.

5. The AE imaging system of claim 1, wherein the generated discrete number is routed to the output of the first multiplexer in the streaming mode, and the count output is routed to the output of the first multiplexer in the motion detection mode.

6. An automatic exposure (AE) imaging method, comprising:
  (a) capturing an analog image by an image sensor;
  (b) converting the analog image into a digital image;
  (c) performing a single-frame image step that processes the digital image;
  (d) generating a discrete number representing a determined exposure time according to an output of the single-frame image step;
  (e) generating a plurality of different exposure times in sequence in each frame period in a motion detection mode, and outputting the determined exposure time in a streaming mode, under control of a motion-detect signal; and
  (f) controlling the image sensor according to said different exposure times in the motion detection mode or according to the determined exposure time in the streaming mode;

wherein the step (e) comprises:
generating a count output;
receiving the generated discrete number and the count output, one of which is first multiplexed as a first multiplex output;
storing said different exposure times at a plurality of registers respectively; and
receiving said different exposure times, one of which is second multiplexed as a second multiplex output under control of the first multiplex output.

7. The AE imaging method of claim 6, further comprising:
generating the motion-detect signal according to a preceding digital image and a current digital image;
wherein the AE imaging method is in the streaming mode when the motion-detect signal is asserted, otherwise the AE imaging method is in the motion detection mode.

8. The AE imaging method of claim 6, wherein the discrete number is generated further according to a predetermined value.

9. The AE imaging method of claim 8, wherein the discrete number representing an exposure time that is closest to the predetermined value is generated as the determined exposure time in the step (d).

10. The AE imaging method of claim 6, wherein the generated discrete number is first multiplexed as the first multiplex output in the streaming mode, and the count output is first multiplexed as the first multiplex output in the motion detection mode.

* * * * *